United States Patent
Oki et al.

(10) Patent No.: US 8,216,962 B2
(45) Date of Patent: Jul. 10, 2012

(54) URETHANE-FORMING REACTION CATALYST AND METHOD FOR PRODUCING URETHANE MATERIAL

(75) Inventors: Hironobu Oki, Sakura (JP); Yasuyuki Watanabe, Sakura (JP); Youichi Abe, Sakura (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/120,840

(22) PCT Filed: Sep. 16, 2009

(86) PCT No.: PCT/JP2009/066124
§ 371 (c)(1),
(2), (4) Date: Jun. 1, 2011

(87) PCT Pub. No.: WO2010/035666
PCT Pub. Date: Apr. 1, 2010

(65) Prior Publication Data
US 2011/0237758 A1    Sep. 29, 2011

(30) Foreign Application Priority Data
Sep. 26, 2008   (JP) ................................ 2008-247822

(51) Int. Cl.
C08G 18/22   (2006.01)
B01J 21/04   (2006.01)
B01J 21/08   (2006.01)
B01J 21/10   (2006.01)
B01J 21/14   (2006.01)

(52) U.S. Cl. ........ 502/240; 502/242; 502/250; 502/308; 502/321; 502/439; 528/44

(58) Field of Classification Search .............. 528/44–85; 502/240, 242, 250, 253–255, 308, 309, 321, 502/439
See application file for complete search history.

(56) References Cited

U.S. PATENT DOCUMENTS
4,269,737 A * 5/1981 Grenoble et al. ............. 502/204
(Continued)

FOREIGN PATENT DOCUMENTS
JP        08-245923 A     9/1996
(Continued)

OTHER PUBLICATIONS

Reddy et al. Surface characterization of sulfate, molybdate, and tungstate promoted TiO2-ZrO2 solid acid catalysts by XPS and other techniques. Applied Catalysis A: General 228 (2002) 269-278.*

(Continued)

*Primary Examiner* — Randy Gulakowski
*Assistant Examiner* — Mike M Dollinger
(74) *Attorney, Agent, or Firm* — Edwards Wildman Palmer LLP; James E. Armstrong, IV; Junko Harada

(57) ABSTRACT

The present invention provides a urethane-forming reaction catalyst which is useful for catalyzing a reaction between an isocyanate compound, in particular, an aliphatic isocyanate and a hydroxyl group-containing compound to form a urethane material, which does not affect the performance of the urethane material, and which can be easily removed from the resulting urethane material, and a method for producing a metal compound-free urethane material using the urethane-forming reaction catalyst. The catalyst of the present invention is a urethane-forming reaction catalyst for producing a urethane material by allowing a hydroxyl group-containing compound to react with an isocyanate compound, the catalyst being at least one solid acid catalyst selected from the group consisting of a (A) composite metal oxide in which a metal oxide (A-2) or a non-metal compound (A-3) is carried on a surface of a metal oxide carrier (A-1), (B) zeolite, and a (C) heteropoly acid.

7 Claims, 1 Drawing Sheet

U.S. PATENT DOCUMENTS

| | | | |
|---|---|---|---|
| 5,773,648 A * | 6/1998 | Becker et al. | 560/240 |
| 6,777,524 B1 * | 8/2004 | Shimizu et al. | 528/76 |
| 6,870,014 B2 * | 3/2005 | Steinbrenner et al. | 526/90 |
| 7,211,681 B2 * | 5/2007 | Furuta | 554/174 |
| 7,297,752 B2 * | 11/2007 | Bernard | 528/44 |
| 7,833,931 B2 * | 11/2010 | Oki et al. | 502/308 |

FOREIGN PATENT DOCUMENTS

| | | |
|---|---|---|
| JP | 09-031151 A | 2/1997 |
| JP | 11-322884 A | 11/1999 |
| JP | 11-513408 T | 11/1999 |
| JP | 2003-082052 A | 3/2003 |
| JP | 2004-231878 A | 8/2004 |
| JP | 2005-089527 A | 4/2005 |
| WO | WO-01/14444 A1 | 3/2001 |
| WO | WO 0114444 A1 * | 3/2001 |
| WO | WO-2008/117769 A1 | 10/2008 |

OTHER PUBLICATIONS

Tetsuo Yokoyama, "Poriuretan no Kouzou/Bussei to Koukinouka oyobi Ouyoutenkai (Structures/physical properties of polyurethane, improvement in function thereof, and development of application thereof)," Technical Information Institute Co., Ltd., 1998, p. 325, a cover page and information sheet (4 sheets), a partial translation and certificate of translation (2 sheets).

International Search Report dated Jan. 12, 2010, issued for PCT/JP2009/066124.

Notification of Reason for Refusal mailed on May 18, 2010, issued for the corresponding Japanese application No. 2010-504317.

* cited by examiner

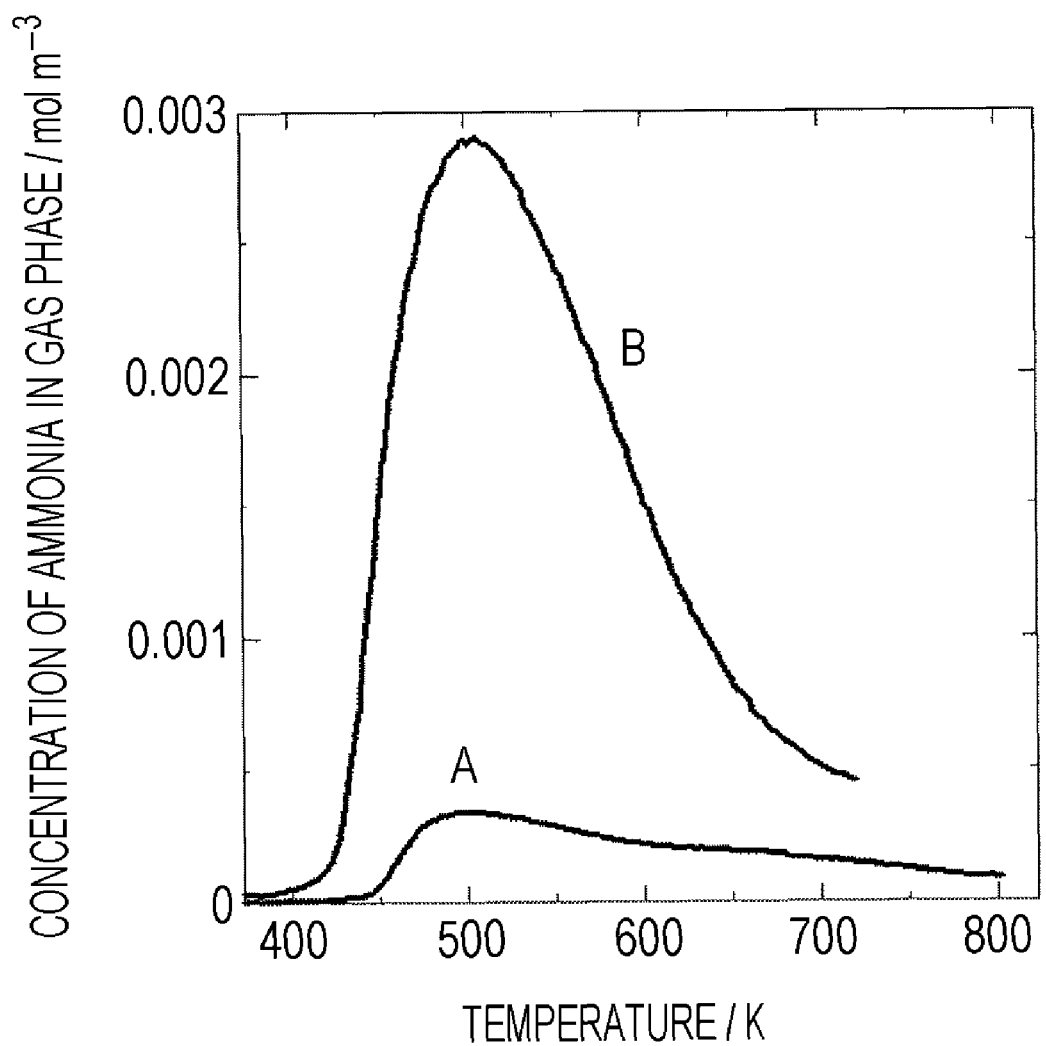

URETHANE-FORMING REACTION CATALYST AND METHOD FOR PRODUCING URETHANE MATERIAL

TECHNICAL FIELD

The present invention relates to a urethane-forming reaction catalyst for catalyzing a reaction between an isocyanate compound and a hydroxyl group-containing compound, and a method for producing a urethane material using the catalyst.

BACKGROUND ART

Urethane materials obtained by a reaction between an isocyanate compound and a hydroxyl group-containing compound such as a hydroxyl group are used in various fields.

For example, polyurethane resins produced by allowing a polyisocyanate compound to react with a polyol such as a diol in the presence of a catalyst and, if necessary, additives such as a foaming agent, a surfactant, and a cross-linking agent are widely used in applications such as automobiles, architectures, household electric appliances, heavy duty coatings, plastic coatings, and adhesives because curing reactions of such polyurethane resins proceed even at room temperature, resins having a cross-linked structure can be formed, and such polyurethane resins are excellent in terms of flexibility and adhesiveness with base materials.

Furthermore, urethane (meth)acrylates produced by allowing a compound having a hydroxyl group and a radical polymerizable group, such as hydroxylethyl(meth)acrylate, to react with a polyisocyanate in the presence of a catalyst or by allowing a compound having an isocyanate group and a radical polymerizable group, such as (meth)acryloyl isocyanate, to react with a polyol in the presence of a catalyst are widely used as active-energy-ray-curable resins, specifically, as protective film materials and adhesives of various base materials such as glass, ceramics, metals, paper, and wood because such urethane (meth)acrylates have characteristics such as sufficient strength and flexibility after curing, and various resins can be designed depending on the backbone of the polyol.

Furthermore, two-liquid type urethane-forming compositions that utilize a urethane-forming reaction are used in polyurethane paintings, adhesives, formed articles, sealants, production of hard or soft foams, and elastomers.

Isocyanate compounds used in a urethane-forming reaction include aromatic isocyanates typified by tolylene diisocyanate (TDI) and diphenylmethane diisocyanate (MDI); and aliphatic isocyanates typified by dicyclohexylmethane diisocyanate (HMDI) and isophorone diisocyanate (IPDI). Although yellowing caused by light or heat does not readily occur in the latter isocyanate compounds, the rate of reaction with a hydroxyl group-containing compound is significantly lower than that of the former isocyanate compounds, and thus highly active catalysts have been desired. As urethane-forming reaction catalysts used in urethane-forming reactions, metal catalysts are widely used. Organotin catalysts are used because of high activity thereof, and dibutyltin dilaurate (DBTDL) or stannous octoate are mainly used (refer to, for example, Non-Patent Document 1).

However, as for the organotin catalysts, recently, a problem of toxicity of organotin catalysts has been pointed out. In particular, tributyltin contained as an impurity in DBTDL causes a problem of hazardousness to the human body as an environmental hormone. Thus, alternative catalysts have been desired.

It is known that compounds of lead, mercury, or bismuth also accelerate urethane-forming reactions. However, since these heavy metal compounds have high toxicity, the use of these compounds also tends to be suppressed similarly to organotin compounds. It has long been known that compounds of a transition metal such as iron, copper, titanium, zirconium, nickel, cobalt, or manganese, in particular, acetylacetonato complexes of these metals have high urethane-forming activity (refer to, for example, Patent Document 1).

As non-metal catalysts, tertiary amine catalysts are used, but the catalytic activity thereof is low. Therefore, a method in which a tertiary amine catalyst is added to a metal acetylacetonato complex has been proposed (refer to, for example, Patent Document 2 and Patent Document 3). According to the methods described in the documents, the catalytic activity increases, and a curing rate substantially the same as that when an organotin catalyst is used can be achieved. However, these methods have a problem that a metal compound used as the catalyst remains in the resulting product.

Patent Document 1: Japanese Unexamined Patent Application Publication No. 09-031151
Patent Document 2: Japanese Unexamined Patent Application Publication No. 2003-82052
Patent Document 3: Japanese Unexamined Patent Application Publication No. 2004-231878
Non-Patent Document 1: "Poriuretan no Kouzou/Bussei to Koukinouka oyobi Ouyoutenkai (Structures/physical properties of polyurethane, improvement in function thereof, and development of application thereof)" authored by Tetsuo Yokoyama, published by Technical Information Institute Co., Ltd., issued in 1998, page 325

DISCLOSURE OF THE INVENTION

Problems to be Solved by the Invention

Accordingly, an object of the present invention is to provide a urethane-forming reaction catalyst which is useful for catalyzing a reaction between an isocyanate compound, in particular, an aliphatic isocyanate compound and a hydroxyl group-containing compound to form a urethane material, which does not affect the performance of the urethane material, and which can be easily removed from the resulting urethane material. Another object of the present invention is to provide a method for producing a metal compound-free urethane material using the urethane-forming reaction catalyst.

Means for Solving the Problems

The inventors of the present invention found that a solid acid catalyst can catalyze a reaction between a hydroxyl group-containing compound and an isocyanate compound to form a urethane material, and that a problem such as toxicity or coloring due to a metal can be prevented by isolating the solid acid catalyst after the reaction.

Specifically, the present invention provides a urethane-forming reaction catalyst for producing a urethane material by allowing a hydroxyl group-containing compound to react with an isocyanate compound, the catalyst being at least one solid acid catalyst selected from the group consisting of a (A) composite metal oxide in which a metal oxide (A-2) or a non-metal compound (A-3) is carried on a surface of a metal oxide carrier (A-1); (B) zeolite; and a (C) heteropoly acid.

The present invention further provides a method for producing a urethane material including allowing a hydroxyl group-containing compound to react with an isocyanate compound in the presence of the above-mentioned urethane-forming reaction catalyst.

Advantages

Since the urethane-forming reaction catalyst of the present invention is a solid, the catalyst and the target urethane material can be easily separated from each other, and a urethane material that does not contain a metal compound serving as a catalyst can be obtained. Furthermore, since the catalyst can be recovered and reused, there is no limitation in the amount of catalyst that can be used and thus a large amount of catalyst can be used compared with existing homogeneous catalysts. Consequently, productivity is improved, which is industrially advantageous.

Although the mechanism in which the solid acid catalyst of the present invention catalyzes a urethane-forming reaction is not clear, it is believed that an acid site functioning as an active site is present on a surface of the solid acid catalyst, a hydroxyl group of a hydroxyl group-containing compound, which is a raw material used in the urethane-forming reaction, is dissociated and adsorbed on the catalytically active site to accelerate an addition reaction with a compound having an isocyanate group present in the vicinity of the catalyst. For example, in the presence of a tin-based catalyst, it is believed that a urethane material is obtained as follows: A nitrogen (N) atom of an isocyanate group is coordinated to tin and activated, an alkoxide is added thereto, and thus the urethane material is obtained by way of a tin-carbamic acid complex.

BEST MODES FOR CARRYING OUT THE INVENTION

Urethane-Forming Catalyst

A urethane-forming reaction catalyst of the present invention is characterized by being at least one solid acid catalyst selected from the group consisting of a (A) composite metal oxide in which a metal oxide (A-2) or a non-metal compound (A-3) is carried on a surface of a metal oxide carrier (A-1); (B) zeolite; and a (C) heteropoly acid.

In the (A) composite metal oxide in which a metal oxide (A-2) or a non-metal compound (A-3) is carried on a surface of a metal oxide carrier (A-1) (hereinafter abbreviated as "composite metal oxide (A)"), the composite metal oxide (A) capable of being used as the urethane-forming reaction catalyst of the present invention, from the standpoint of the ease of the design and modification of the catalyst, the possibility of exertion of sufficient catalytic activity, and the like, the metal oxide carrier (A-1) is preferably composed of zirconia ($ZrO_2$), silica ($SiO_2$), alumina ($Al_2O_3$), titania ($TiO_2$), silica.alumina ($SiO_2.Al_2O_3$), silica.zirconia ($SiO_2.ZrO_2$), magnesia (MgO), tin oxide ($ZnO_2$ or ZnO), hafnium oxide ($HfO_2$), iron oxide ($Fe_2O_3$ or $Fe_3O_4$), diatomaceous earth, cordierite, zeolite, or the like. Among these, zirconia ($ZrO_2$), silica ($SiO_2$), alumina ($Al_2O_3$), and titania ($TiO_2$) are particularly preferable. The metal oxide carrier (A-1) may be used alone or in combination of a plurality of metal oxides.

As the metal oxide (A-2) that is carried, an oxide containing, as a metal element, molybdenum, tungsten, tantalum, or the like is suitably used. Specific examples thereof include molybdenum oxides (e.g., $MoO_3$), tungsten oxides (e.g., $WO_3$), and tantalum oxides (e.g., $Ta_2O_3$). The metal oxide (A-2) that is carried may be carried in combination with any one or more types of other elements, as required, to form a composite. Examples of the other elements that may be used for forming the composite include silicon, aluminum, phosphorus, tungsten, cesium, niobium, titanium, tin, silver, copper, zinc, chromium, tellurium, antimony, bismuth, selenium, iron, magnesium, calcium, vanadium, cerium, manganese, cobalt, iodine, nickel, lanthanum, praseodymium, neodymium, promethium, samarium, europium, gadolinium, terbium, dysprosium, holmium, erbium, thulium, ytterbium, and lutetium.

Examples of the combination of the metal oxide carrier (A-1) and the metal oxide (A-2) particularly preferably include a combination of zirconia and a molybdenum oxide (zirconia molybdate) and a combination of zirconia and a tungsten oxide.

An example of a method for carrying the metal oxide (A-2) on a zirconia-based carrier oxide is a method in which a solution of a soluble compound of an element corresponding to the metal oxide (A-2) is impregnated into or mixed with the carrier oxide, and calcination is then conducted. Specific examples of the soluble compound of an element corresponding to the metal oxide (A-2) include ammonium molybdate $[(NH_4)_6Mo_7O_{24}].4H_2O$, ammonium molybdophosphate $[(NH_4)_5PMo_{12}O_{40}].xH_2O$, ammonium metatungstate $[(NH_4)_6(H_2W_{12}O_{40})].xH_2O$, ammonium 12-tungstate $[(NH_4)_{10}W_{12}O_{42}H_2].10H_2O$, ammonium decatungstophosphate $[(NH_4)_5PW_{12}O_{40}].14H_2O$, trimethyl borate, and orthoboric acid.

When the urethane-forming reaction catalyst of the present invention need not be isolated, for example, when the urethane-forming reaction catalyst is used in a two-liquid type urethane-forming composition or the like, as the metal species, those having low toxicity are preferably selected. Examples thereof include zirconia molybdate including zirconia and a molybdenum oxide, and zirconia tungstate including zirconia and a tungsten oxide.

As the non-metal compound (A-3) that is carried, a sulfuric acid radical-containing compound or a phosphoric acid radical-containing compound is preferable.

For example, an oxide in which an acid radical is carried on a zirconia-based carrier oxide can be obtained by incorporating an inorganic acid or a salt thereof in a zirconia-based oxide serving as a carrier, and conducting calcination at 673 K to 1,073 K. Examples of the inorganic acid or a salt thereof include sulfuric acid, hydrochloric acid, phosphoric acid, carbonic acid, nitric acid, boric acid, and salts thereof such as ammonium salts, sodium salts, and potassium salts. In the present invention, in particular, sulfuric acid, ammonium sulfate, sodium sulfate, and the like are preferably used. Such an oxide on which an acid radical is carried can be prepared by a well-known conventional method.

The composite metal oxide (A) exerts a catalytic action to reaction raw materials to allow a urethane-forming reaction to proceed. Specifically, a reaction between a hydroxyl group-containing compound and an isocyanate compound, which are reaction raw materials, proceed by way of processes such as adsorption, reaction, and desorption on an active site on the surface of the catalyst. Accordingly, it is preferable to form a catalytically active site on the surface of the composite metal oxide (A), and it is particularly preferable to allow the catalytic action to exert on the surface of the metal oxide (A-2) or the surface of the non-metal compound (A-3). Therefore, the metal oxide (A-2) or the non-metal compound (A-3) is preferably carried on the surface of the metal oxide carrier (A-1).

Examples of a method for carrying the metal oxide (A-2) or the non-metal compound (A-3) on the metal oxide carrier (A-1) include an equilibrium adsorption method, an incipient wetness method, and an evaporation-to-dryness method.

The equilibrium adsorption method is a method in which the metal oxide carrier (A-1) is immersed in a solution of a metal to be carried to conduct adsorption and the excess solution is then filtered out. The amount carried is determined by the concentration of the solution and the pore volume. This method has a problem that, for example, the composition of the solution changes with the addition of the carrier.

The incipient wetness method is a method in which after evacuation of the metal oxide carrier (A-1), a solution of a metal to be carried is gradually added in an amount corresponding to the pore volume so that the surface of the metal oxide carrier (A-1) is uniformly wet. The amount of metal element carried is adjusted by changing the concentration of the solution.

The evaporation-to-dryness method is a method in which the metal oxide carrier (A-1) is immersed in a solution, and a solvent is then evaporated to carry a solute. Although the amount carried can be increased, a metal component that is weakly bonded to the carrier is concentrated during drying, and the concentrated metal component tends to become large metal particles after a reduction treatment.

Among these methods, it is preferable to select a carrying method in consideration of properties of the catalyst.

The method for producing the composite metal oxide (A) is not particularly limited, and the composite metal oxide (A) can be produced by a known method. For example, in the case of zirconia molybdate, a molybdenum compound and a zirconium compound are allowed to coexist by the above-described carrying method, and a calcination process is performed in air or an atmosphere of, for example, He, Ne, Ar, $N_2$, or $O_2$ preferably at 673 K to 1,473 K, thus obtaining the composite metal oxide (A). When the molybdenum oxide and the zirconium compound are selected, it is necessary to select a metal compound to be carried in consideration of the isoelectric point of the surface of the carrier. A preferable example of the molybdenum compound is ammonium molybdate (($NH_4$)$_6$$Mo_7O_{24}$·$4H_2O$), and a preferable example of the zirconium compound is zirconium hydroxide. In addition, controlling the calcination temperature is preferable in order to sufficiently form a bond between the metal oxide carrier (A-1) and the metal oxide (A-2).

For example, in the case of zirconia molybdate, the calcination is conducted at a temperature preferably in the range of 673 K to 1,473 K, and more preferably in the range of 773 K to 1,273 K. When the calcination temperature is lower than 673 K, the bond between zirconium oxide and molybdic acid is not sufficiently formed, and the activity of the resulting catalyst may be decreased. On the other hand, when the calcination temperature is higher than 1,473 K, the surface area is significantly decreased. Consequently, a sufficient contact area with a reaction substrate is not ensured, and the activity may be decreased.

Preferable examples of the form of the composite metal oxide (A) include, but are not particularly limited to, a particulate form and a cluster form. The size of fine particles of the metal oxide (A-2) that is carried is also not limited. The fine particles preferably form a particulate form having a unit at the submicron to micron level, and respective particles may be, for example, associated or aggregated together.

The (B) zeolite that can be used as the urethane-forming reaction catalyst of the present invention is a crystalline aluminosilicate, and the basic structural unit thereof is a tetrahedron including silicon, aluminum cations and oxygen anions. There are 100 or more types of zeolite depending on the geometrical arrangement of the tetrahedron of silica and alumina. Among these, mordenite-, ZSM-5-, β-, or faujasite-zeolite having a hydrogen counter ion is preferable. In order to synthesize such a zeolite, raw materials such as a silica source, an alumina source, an alkali source, and water are necessary. As the silica source, sodium silicate ($Na_2SiO_3$), colloidal silica, fumed silica, an alkoxide, or the like is used. As the alumina source, aluminum hydroxide ($Al(OH)_3$), sodium aluminate ($Na_2Al_2O_4$), an alkoxide, or the like is used. As the alkali source, sodium hydroxide, potassium hydroxide, or the like is used.

All of the above raw materials are compounds such as a salt, an oxide, or a hydroxide of silicon or aluminum. In general, zeolite can be synthesized by a hydrothermal synthesis method that uses a hydrothermal reaction in which a high-temperature and high-pressure state is maintained in the presence of water. A highly reactive amorphous hydrogel prepared so as to have a desired chemical composition is charged in a pressure container such as an autoclave, and heated at a predetermined temperature, thus synthesizing zeolite.

As the (C) heteropoly acid that can be used as the urethane-forming reaction catalyst of the present invention, acid salts of a heteropoly acid are preferably used. The acid salts of a heteropoly acid refer to acid metal salts and acid onium salts of an acid produced by condensation of two or more types of inorganic oxyacids. Examples of the heteroatom of the heteropoly acid include phosphorus, silicon, boron, aluminum, germanium, titanium, zirconium, cerium, cobalt, chromium, and sulfur. Examples of the polyatom include molybdenum, tungsten, vanadium, niobium, and tantalum. These heteropoly acids are publicly known and can be produced by a conventional method.

Examples of the heteropoly acid that can be used in the present invention include known heteropoly acids. Specific examples thereof include phosphomolybdic acid, phosphotungstic acid, silicomolybdic acid, and silicotungstic acid. Among these heteropoly acids, heteropoly acids represented by $H_3PMo_xW_{12-x}O_{40}$ or $H_4SiMo_xW_{12-x}O_{40}$ (where x is an integer in the range of $1 \leq x \leq 12$) in which the heteroatom is phosphorus or silicon and the polyatom is molybdenum or composed of a mixed coordination of molybdenum and tungsten are particularly preferable because a satisfactory performance of the resulting urethane-forming reaction catalyst can be realized when an acid metal salt or an acid onium salt of the heteropoly acid is formed.

Examples of the acid metal salt of a heteropoly acid include salts of an alkali metal such as sodium, potassium, rubidium, or cesium; salts of an alkaline earth metal such as beryllium, magnesium, calcium, strontium, or barium; salts of a transition metal such as copper, silver, zinc, or mercury; and salts of a typical element such as aluminum, thallium, tin, or lead. Examples of the acid onium salt of a heteropoly acid include amine salts, ammonium salts, and phosphonium salts.

Note that the number of substituted hydrogen atoms in acid salts of a heteropoly acid is not particularly limited. The method of use thereof is also not particularly limited. The acid salts of a heteropoly acid may be carried on a carrier such as silica, alumina, silica.alumina silica.zirconia, diatomaceous earth, zeolite, titania, zirconia, silicon carbide, activated carbon, or the like and used.

The urethane-forming reaction catalyst of the present invention is a solid catalyst and is not dissolved in a liquid phase of a hydroxyl group-containing compound and an isocyanate compound, which are raw materials of a urethane-forming reaction.

Examples of the form of the urethane-forming reaction catalyst of the present invention include, but are not limited to, a powdered form, a spherical particulate form, an irregular granular form, a cylindrical pellet form, an extruded shape, and a ring shape. Furthermore, the urethane-forming reaction catalyst may also have pores having a size of about several angstroms or larger, and the reaction sites may be in a space-restricted state inside these pores. The size of the urethane-forming reaction catalyst is also not particularly limited. Considering that the urethane-forming reaction catalyst is isolated after the urethane synthesis, the urethane-forming reaction catalyst preferably has a relatively large particle diameter.

(Hydroxyl Group-Containing Compound and Isocyanate Compound)

A hydroxyl group-containing compound and an isocyanate compound that are used in the present invention are not particularly limited as long as they are compounds used in the usual production of urethanes.

(Hydroxyl Group-Containing Compound and Isocyanate Compound which are Raw Materials of Production of Polyurethane)

The hydroxyl group-containing compound which is a raw material of the production of polyurethane is not particularly limited as long as it is a compound used in the usual production of polyurethane. Examples thereof include polyhydric alcohols, polyether polyols, polyester polyols, and polymer polyols.

Examples of the polyhydric alcohol include dihydric alcohols such as ethylene glycol, 1,2-propylene glycol, 1,3-propylene glycol, 1,2-butanediol, 1,3-butanediol, 2-methyl-1,3-propanediol, 1,4-butanediol, neopentyl glycol, 1,5-pentanediol, 3-methyl-1,5-pentanediol, 1,6-hexanediol, 2-methyl-2-butyl-1,3-propanediol, 2,2,4-trimethyl-1,3-pentanediol, 2-ethyl-1,3-hexanediol, 2-methyl-1,8-octanediol, 1,9-nonanediol, 2,4-diethyl-1,5-pentanediol, 2-ethyl-2-butyl-1,3-propanediol, diethylene glycol, dipropylene glycol, and triethylene glycol; glycerol; trimethylolpropane; pentaerythritol; and sorbitol. Among these polyhydric alcohols, dihydric alcohols are mainly used, and these polyhydric alcohols may be used alone or in combination of two or more types of alcohols.

As the polyether polyols, well-known polyether polyols can be used. For example, the polyether polyols are obtained by allowing an alkylene polyol such as ethylene glycol or propylene glycol to react with an alkylene oxide such as ethylene oxide or propylene oxide.

As the polyester polyols, well-known polyester polyols can be used. For example, the polyester polyols are obtained by allowing a polycarboxylic acid such as maleic acid or phthalic acid to react with an alkylene polyol such as ethylene glycol or propylene glycol.

As the polymer polyols, well-known polymer polyols can be used. Examples thereof include homopolymers of a hydroxyl group-containing acrylate such as hydroxyethyl acrylate or hydroxybutyl acrylate; and copolymers of such an acrylate with a monomer, such as acrylic acid or styrene, which is copolymerizable with the acrylate.

As the isocyanate compound which is a raw material of the production of polyurethane, compounds having two or more isocyanate groups (hereinafter abbreviated as "polyisocyanate") are suitably used. Examples thereof include diphenylmethane diisocyanate (MDI), tolylene diisocyanate (TDI), hexamethylene diisocyanate (HDI), trimethyl hexamethylene diisocyanate (TMDI), phenylene diisocyanate (PPDI), dicyclohexylmethane diisocyanate (HMDI), dimethyldiphenyl diisocyanate (TODI), dianisidine diisocyanate (DADI), xylylene diisocyanate (XDI), tetramethyl xylylene diisocyanate (TMXDI), isophorone diisocyanate (IPDI), naphthalene diisocyanate (NDI), cyclohexyl diisocyanate (CHDI), and lysine diisocyanate (LDI). Furthermore, modified compounds of these polyisocyanates, for example, urethane-modified TDI, allophanate-modified TDI, biuret-modified TDI, isocyanurate modified compounds, and the like may also be used. These polyisocyanates may be used alone or as a mixture of two or more types of compounds.

(Hydroxyl Group-Containing Compound and Isocyanate Compound which are Raw Materials of Production of Reactive Compound Having Urethane Bond)

When a reactive compound having a urethane bond is produced by using a urethane-forming reaction, either a hydroxyl group-containing compound or an isocyanate compound preferably has a reactive group. As the reactive group, a radical polymerizable group is preferable because such a group can be used for active-energy-ray curing or heat curing.

Examples of a compound having one isocyanate group and a radical polymerizable group include (meth)acryloyl isocyanate, (meth)acryloylethyl isocyanate, and (meth)acryloylalkyl isocyanate.

Examples of a compound having one active hydrogen group, e.g., a hydroxyl group, and a radical polymerizable group include hydroxyl group-containing (meth)acrylates such as 2-hydroxyethyl(meth)acrylate, 2-hydroxypropyl (meth)acrylate, 3-hydroxypropyl(meth)acrylate, 2-hydroxybutyl (meth)acrylate, 3-hydroxybutyl(meth)acrylate, 4-hydroxybutyl(meth)acrylate, 3-chloro-2-hydroxypropyl (meth)acrylate, di-2-hydroxyethyl fumarate, mono-2-hydroxyethyl-monobutyl fumarate, and polyethylene glycol mono(meth)acrylate.

Either such a hydroxyl group-containing compound or isocyanate compound having a reactive group is allowed to react with the polyol or polyisocyanate described as the raw material of polyurethane.

The inventors of the present application found that a composite metal oxide (AA) which is one example of the composite metal oxide (A), specifically, a composite metal oxide (AA) in which zirconia is used as the metal oxide carrier (A-1) and a molybdenum oxide is used as the metal oxide (A-2), the composite metal oxide (AA) having a Hammett acidity function ($H_0$) in the range of −3 to −9, is useful as a catalyst for production of polyester (PCT/JP2008/055397). Accordingly, by producing, as the above-mentioned polyol, a polyester polyol in the presence of the composite metal oxide (AA) and adding the above-mentioned isocyanate compound to the reaction product containing the polyester polyol to conduct a reaction, a polyester urethane material can be obtained in the same vessel using the same catalyst.

In the case where, for example, a urethane (meth)acrylate or the like is produced by employing this method, first, a polyol and a polyvalent carboxylic acid that are used as raw materials of a polyester polyol, and the composite metal oxide (AA) are charged, and the polyol and the polyvalent carboxylic acid are allowed to react with each other in the presence of the composite metal oxide (AA) to obtain the polyester polyol.

Next, when the above-mentioned isocyanate compound is added to the reaction product containing the polyester polyol, the isocyanate compound easily reacts because of the presence of the composite metal oxide (AA). This method is an industrially very useful method because the production can be performed in the same vessel. In addition, the composite metal oxide (AA) functioning as the catalyst can also be easily isolated from the urethane (meth)acrylate which is a final product.

Specifically, an esterification reaction of a polyol and a polyvalent carboxylic acid is conducted in the presence of the composite metal oxide (AA). Examples of the polyester in such a case include polyester resins, polyester polyols, and unsaturated polyesters.

As the polyol used in the present invention, the polyols described as a raw material of the urethane material can also be used in the synthesis of the polyester.

Furthermore, the production method of the present invention may be performed without using the same vessel. Specifically, after a polyester polyol is produced using the present invention, a step of transfer, division, or the like of the resulting product may be performed, and a urethane-forming reaction with an isocyanate compound may then be sequentially conducted in a different reaction vessel using the catalyst used in the production of the polyester polyol.

Examples of the polyvalent carboxylic acid used in the present invention include polybasic acids such as saturated dibasic acids and $\alpha,\beta$-unsaturated dibasic acids, all of which are usually used in the synthesis of polyesters or unsaturated polyesters. If necessary, monobasic acids may also be used. Examples of the saturated dibasic acid include dibasic acids such as oxalic acid, malonic acid, succinic acid, glutaric acid, adipic acid, pimelic acid, suberic acid, azelaic acid, sebacic acid, 1,12-dodecane dicarboxylic acid, phthalic anhydride, isophthalic acid, terephthalic acid, dimer acid, halogenated phthalic anhydrides, tetrahydrophthalic acid, tetrahydrophthalic anhydride, hexahydrophthalic acid, hexahydrophthalic anhydride, hexahydroterephthalic acid, hexahydroisophthalic acid, 2,6-naphthalenedicarboxylic acid, 2,7-naphthalenedicarboxylic acid, 2,3-naphthalenedicarboxylic acid, 2,3-naphthalenedicarboxylic anhydride, 4,4'-biphenyldicarboxylic acid, dialkyl esters thereof; acid anhydrides and the like of these dibasic acids; and polybasic acids such as pyromellitic acid.

These polyvalent carboxylic acids may be used alone or in combination of two or more types of polyvalent carboxylic acids. Examples of the $\alpha,\beta$-unsaturated dibasic acid include maleic acid, maleic anhydride, fumaric acid, itaconic acid, and itaconic anhydride. The amount of polyvalent carboxylic acids in an unsaturated polyester is preferably 30 to 50 mass percent.

The ratio of the polyol to the polyvalent carboxylic acid used in the present invention is preferably 1:3 to 3:1, and more preferably 1:2 to 2:1 in terms of equivalent ratio in consideration of the number of functional groups thereof. The equivalent ratio is appropriately selected in accordance with the target resin.

In the method for producing a polyester using the composite metal oxide (AA), the dehydration condensation of the polyvalent carboxylic acid and the polyol, which are raw material, can be conducted by, for example, (1) a method in which the polyol and the polyvalent carboxylic acid are subjected to condensation polymerization under normal pressure;

(2) a method in which the two raw materials are subjected to condensation polymerization in a vacuum; or (3) a method in which condensation polymerization is conducted in the presence of an inert solvent such as toluene.

The condensation polymerization reaction is preferably conducted in an atmosphere of an inert gas such as nitrogen from the standpoint of preventing coloring of the resulting polyester, polyester polyol, or unsaturated polyester.

(Method for Removing Urethane-Forming Catalyst)

In the removal of the above-described solid acid catalyst, when the resulting urethane material has a low viscosity, the catalyst can be easily removed by a method of filtration or the like. When the resulting urethane material has a high viscosity and filtration thereof is difficult to perform, the viscosity is decreased by appropriately diluting the urethane material with a solvent or by heating, and filtration is then performed. Thus, the catalyst can be easily removed. Alternatively, by using a catalyst having a large particle diameter and using a fixed-bed flow reactor, the catalyst can be isolated without performing filtration.

(Two-Liquid Type Urethane-Forming Composition)

The urethane-forming reaction catalyst of the present invention may be used in a two-liquid type urethane-forming composition. In such a case, when the (A) composite metal oxide in which a carried metal oxide (A-2) is carried on a surface of a metal oxide carrier (A-1) is selected as the urethane-forming reaction catalyst, the type of metal can be appropriately selected, and thus a metal having low toxicity can be selected. Thus, the urethane-forming reaction catalyst can also be suitably used as a catalyst for a two-liquid type urethane-forming composition from which the catalyst need not be isolated.

A mixture of a hydroxyl group-containing compound and a polyisocyanate or a prepolymer of a hydroxyl group-containing compound and a polyisocyanate and the urethane-forming reaction catalyst of the present invention are contained. In this case, the catalyst is added to the hydroxyl group-containing compound or the isocyanate compound.

The two-liquid type urethane-forming composition according to the present invention contains the catalyst for curing polyurethane and the mixture of a hydroxyl group-containing compound and an isocyanate compound. Alternatively, instead of the mixture of the hydroxyl group-containing compound and the isocyanate compound, a prepolymer in which the mixture of a hydroxyl group-containing compound and an isocyanate compound is reacted in advance can also be used. The compositions for polyurethane include a one-liquid type composition for polyurethane in which the mixture or the prepolymer and the urethane-forming reaction catalyst of the present invention are mixed, and a two-liquid type composition for polyurethane in which the mixture or the prepolymer and the urethane-forming reaction catalyst of the present invention are not in a mixed state. These compositions are appropriately selected in accordance with the use thereof.

In the mixture of a hydroxyl group-containing compound and an isocyanate compound, the mixing ratio of these compounds is preferably 1.0 to 1.2 on a basis of the molar ratio of hydroxyl group/isocyanate group. The prepolymer (1-b) can be obtained by reacting the mixture (1-a) by a publicly known method.

The urethane-forming reaction catalyst of the present invention is preferably used in an amount in the range of 0.01 to 0.5 parts by mass relative to 100 parts by mass of the amount of mixture or prepolymer used.

The two-liquid type urethane-forming composition can be cured at a temperature generally in the range of 10° C. to 40° C., preferably 15° C. to 35° C., and more preferably 20° C. to 30° C. within a short time, and thus polyurethane having a high hardness can be obtained.

EXAMPLES

The present invention will now be more specifically described by way of Examples.

Note that a conversion rate (%) in Examples and Comparative Examples is calculated by equations below, and evaluated.

$$\text{Conversion rate (\%)}=100(\%)-\text{NCO retention rate (\%)} \quad \text{[Math. 1]}$$

$$\text{NCO retention rate (\%)}=(\text{NCO content after reaction (\%)} \div \text{NCO content at the time of charging (\%)}) \times 100(\%) \quad \text{[Math. 2]}$$

Catalyst Preparation Example 1

Production of Zirconia Molybdate

Using 50 g of zirconium hydroxide ($Zr(OH)_4$, produced by Nippon Light Metal Co., Ltd.) that had been dried at 100° C. for one night and an aqueous solution (0.04 mol·$dm^{-3}$) prepared by dissolving a required amount of ammonium molybdate [$(NH_4)_6Mo_7O_{24}$]·$4H_2O$ (produced by Kishida Chemical Co., Ltd.)] in pure water, an amount of the aqueous ammonium molybdate solution equivalent to the pore volume of the zirconium hydroxide was gradually added to uniformly wet the surface of the zirconium carrier, thus preparing a precursor before calcination (incipient wetness method). The concentration of the solution was adjusted so that the amount of molybdenum trioxide ($MoO_3$) carried was equivalent to Mo/Zr=0.1 in terms of mass ratio. As a reaction pretreatment, calcination was conducted in an oxygen atmosphere at a calcination temperature of 1,073 K for three hours. The resulting product was allowed to cool naturally to room temperature. Thus, a solid acid catalyst (AA-1) was obtained.

Catalyst Preparation Example 2

Production of Zirconia Molybdate

A catalyst was prepared as in Example 1 described above except that the calcination temperature was changed to 673 K to obtain a solid acid catalyst (AA-2).

Catalyst Preparation Example 3

Production of Zirconia Tungstate

Using 50 g of zirconium hydroxide ($Zr(OH)_4$, produced by Nippon Light Metal Co., Ltd.) that had been dried at 100° C. for one night and an aqueous solution (0.016 mol·$dm^{-3}$) prepared by dissolving a required amount of ammonium paratungstate [$(NH_4)_{10}W_{12}O_{41}$·$5H_2O$ (produced by Kishida Chemical Co., Ltd.)] in pure water, an amount of the aqueous ammonium paratungstate solution equivalent to the pore volume of the zirconium hydroxide was gradually added to uniformly wet the surface of the zirconium carrier, thus preparing a precursor before calcination (incipient wetness method). The concentration of the solution was adjusted so that the amount of tungsten trioxide ($WO_3$) carried was W/Zr=0.2 in terms of mass ratio. As a reaction pretreatment, calcination was conducted in an oxygen atmosphere at a calcination temperature of 1,073 K for three hours. The resulting product was allowed to cool to room temperature. Thus, a solid acid catalyst (AA-3) was obtained.

<Measurement of $H_0$ Function by $NH_3$-TPD Measurement>
Measuring Method:

About 0.1 g of a sample (the solid acid catalyst AA-1 or the solid acid catalyst AA-2) was set in the quartz cell (inner diameter: 10 mm) of a temperature-programmed desorption apparatus TPD-AT-1 produced by BEL Japan, Inc., and the temperature was increased to 423 K (150° C.) at a rate of 5 K $min^{-1}$ under a helium gas flow (30 $cm^3$ $min^{-1}$, 1 atm) and then maintained at 423 K for three hours. Subsequently, while the helium gas flow was maintained, the temperature was decreased to 373 K (100° C.) at a rate of 7.5 K $min^{-1}$, the system was then subjected to vacuum degassing, and 100 Torr (1 Torr=1/760 atm=133 Pa) of $NH_3$ was introduced and allowed to be adsorbed for 30 minutes. Subsequently, the system was degassed for 12 minutes, and a steam treatment was then conducted. In the steam treatment, steam having a vapor pressure of about 25 Torr (about 3 kPa) was introduced at 373 K, the atmosphere in the system was maintained for 30 minutes, degassing was performed for 30 minutes, steam was reintroduced for 30 minutes, and degassing was repeated again for 30 minutes in that order. Subsequently, helium gas was supplied to the system at a rate of 0.041 mmol $s^{-1}$ (equivalent to 60 $cm^3$ $min^{-1}$ at 298 K, 25° C., and 1 atm) while a state of reduced pressure (100 Torr) was maintained, and the atmosphere in the system was maintained at 373 K for 30 minutes. Subsequently, the sample bed was heated to 983 K (710° C.) at a rate of 10 K $min^{-1}$, and a gas evacuated from an outlet was analyzed with a mass spectrometer (ANELVA M-QA 100F).

During the measurement, all the mass spectra for mass numbers (m/e) of 2, 4, 14, 15, 16, 17, 18, 26, 27, 28, 29, 30, 31, 32 and 44 were recorded. After the completion of the measurement, a 1 mol%-$NH_3$/He standard gas was further diluted with helium, gas samples having ammonia gas concentrations of 0, 0.1, 0.2, 0.3, and 0.4 mol % were supplied to a detector so that the total flow rate was 0.041 mmol $s^{-1}$, and spectra were recorded. Thus, a calibration curve of ammonia was prepared to correct the detector strength.

Each of the main mass spectra measured during the temperature-programmed desorption of the solid acid catalyst AA-1 or the solid acid catalyst AA-2 was measured. In both samples, a peak of m/e=16 that represents ammonia desorption was observed in the vicinity of 500 K. Furthermore, a small shoulder of m/e=16 was observed at a temperature of higher than 900 K in the case of the solid acid catalyst AA-1, and at a temperature in the vicinity of 780 K in the case of the solid acid catalyst AA-2. However, in addition to the appearance of these high-temperature shoulders, a large peak of m/e=44 (a $CO_2$ fragment) and a peak of m/e=28 (a $CO_2$ fragment+$N_2$) were also observed. Therefore, it is believed that the high-temperature shoulders are attributable to such fragments of $CO_2$, and are not attributable to ammonia. Accordingly, in the quantitative determination of ammonia described below, these shoulder portions were excluded.

FIG. 1 shows ammonia TPD spectra calculated from the results of m/e=16 on the basis of the measurement results described above. The amount of acid and the acid strength ($\Delta H$) were calculated from these spectra, and are shown in Table 1.

With a one-point method based on an actual measurement, the amount of acid can be determined from the peak area, and the average acid strength can be determined from the peak position and the like. According to this method, the amount of acid per unit of mass of the solid acid catalyst AA-1 was about 0.03 mol $kg^{-1}$ and the amount of acid per unit of mass of the solid acid catalyst AA-2 was about 0.2 mol $kg^{-1}$, which suggests that there is a significant difference between these values. However, the surface density (amount of acid/surface area) was in the range of about 0.4 to 0.7 $nm^{-2}$ for both the solid acid catalysts A and B. The average acid strength of the solid acid catalyst AA-1 was $\Delta H$=133 kJ $mol^{-1}$, which was equivalent to an $H_0$ value of −7.4, whereas the average acid strength of the solid acid catalyst AA-2 was $\Delta H$=116 kJ $mol^{-1}$, which was equivalent to an $H_0$ value of −4.4 and was slightly weak.

TABLE 1

| Catalyst | Peak | Peak temperature | Analytical method | Amount of acid/ mol kg$^{-1}$ | Specific surface area/ m$^2$g$^{-1}$ | Surface density of acid site/nm$^{-2}$ | Heat of adsorption ΔH of ammonia/ kJ mol$^{-1}$ | H$_0$ function |
|---|---|---|---|---|---|---|---|---|
| AA-1 | Entire portion | 509 | One-point method | 0.031 | 26.5 | 0.70 | Average 133 | −7.4 |
| AA-2 | Entire portion | 513 | One-point method | 0.201 | 252.6 | 0.48 | Average 116 | −4.4 |

Example 1

Synthesis of Urethane Acrylate

To a 100-mL round-bottom flask, 4.00 g of hexamethylene diisocyanate, 5.69 g of 2-hydroxyethyl acrylate, and 10.0 g of ethyl acetate serving as a solvent were charged, and 0.30 g of the solid acid catalyst (AA-1) of Catalyst Preparation Example 1 was added thereto as a catalyst.

A reaction was conducted at a reaction temperature of 60° C. under stirring. After five hours from the start of the reaction, a small amount of the reaction mixture was sampled, and the NCO content (%) thereof was measured. The NCO conversion rate determined on the basis of the measurement result was 96%. The reaction mixture was filtered through a 0.2-μm membrane filter to remove the catalyst. Thus, an ethyl acetate solution of a target urethane acrylate was obtained. The residual ratio of the catalyst in the ethyl acetate solution was below the detection limit (5 ppm).

Example 2

Synthesis of Urethane Acrylate

To a 100-mL round-bottom flask, 4.00 g of hexamethylene diisocyanate, 5.69 g of 2-hydroxyethyl acrylate, and 10.0 g of ethyl acetate serving as a solvent were charged, and 0.30 g of the solid acid catalyst (AA-1) of Catalyst Preparation Example 1 was added thereto as a catalyst.

A reaction was conducted at a reaction temperature of 80° C. under stirring. After two hours from the start of the reaction, a small amount of the reaction mixture was sampled, and the NCO content (%) thereof was measured. The NCO conversion rate determined on the basis of the measurement result was 99%. The reaction mixture was filtered through a 0.2-μm membrane filter to remove the catalyst. Thus, an ethyl acetate solution of a target urethane acrylate was obtained. The residual ratio of the catalyst in the ethyl acetate solution was below the detection limit (5 ppm).

Example 3

Synthesis of Urethane Acrylate

To a 100-mL round-bottom flask, 10.00 g of hexamethylene diisocyanate and 14.22 g of 2-hydroxyethyl acrylate were charged, and 0.75 g of the solid acid catalyst (AA-1) of Catalyst Preparation Example 1 was added thereto as a catalyst.

A reaction was conducted at a reaction temperature of 60° C. under stirring. After one hour from the start of the reaction, a small amount of the reaction mixture was sampled, and the NCO content (%) thereof was measured. The NCO conversion rate determined on the basis of the measurement result was 100%. After the reaction mixture was diluted with 25 g of ethyl acetate, the resulting mixture was filtered through a 0.2-μm membrane filter to remove the catalyst. Thus, an ethyl acetate solution of a target urethane acrylate was obtained. The residual ratio of the catalyst in the ethyl acetate solution was below the detection limit (5 ppm).

Example 4

Synthesis of Urethane Acrylate

To a 100-mL round-bottom flask, 4.00 g of hexamethylene diisocyanate, 5.69 g of 2-hydroxyethyl acrylate, and 10.0 g of ethyl acetate serving as a solvent were charged, and 0.30 g of the solid acid catalyst (AA-2) of Catalyst Preparation Example 2 was added thereto as a catalyst.

A reaction was conducted at a reaction temperature of 60° C. under stirring. After six hours from the start of the reaction, a small amount of the reaction mixture was sampled, and the NCO content (%) thereof was measured. The NCO conversion rate determined on the basis of the measurement result was 95%. The reaction mixture was filtered through a 0.2-μm membrane filter to remove the catalyst. Thus, an ethyl acetate solution of a target urethane acrylate was obtained. The residual ratio of the catalyst in the ethyl acetate solution was below the detection limit (5 ppm).

Example 5

Synthesis of Polyurethane

First, 300.0 g of polypropylene glycol having a hydroxyl value of 56.0 (molecular weight: 2,000) was charged in a 500-mL beaker and the temperature thereof was controlled to 80° C., 38.0 g of diphenylmethane diisocyanate, the temperature of which was controlled to 60° C., was added, and 6.8 g of the solid acid catalyst (AA-1) of Catalyst Preparation Example 1 further was added. Furthermore, stirring was conducted while the state in which the temperature was controlled to 80° C. was maintained, and a thickening behavior with the progress of the reaction was traced. The time required for the resin viscosity to reach 20 Pa·s was 14 minutes.

Example 6

Synthesis of Polyester Urethane Acrylate

To a 500-mL four-necked flask equipped with a condenser tube, an aggregation tube, and a nitrogen inlet tube, 131 g of 1,4-butanediol and 169 g of adipic acid, and 6 g of the solid acid catalyst (AA-1) were charged. The temperature was increased to 115° C. while nitrogen was blown at a rate of 10 mL/min, and a reaction was conducted under a reduced pressure of 91 mmHg for 24 hours. Thus, a polyester polyol (molecular weight: about 1,100) having a hydroxyl value (OHV) of 102.4 and an acid value of 0.68 was obtained.

Next, to a 100-mL round-bottom flask, 8.00 g of the polyester polyol, 2.15 g of methacryloyloxyethyl isocyanate, and 10.0 g of ethyl acetate were charged, and a reaction was conducted under stirring for six hours. The reaction mixture was filtered through a 0.2-μm membrane filter to remove the catalyst. An ethyl acetate solution of a target urethane acrylate with an NCO conversion rate of 95% was obtained. The residual ratio of the catalyst in the ethyl acetate solution was below the detection limit (5 ppm).

Example 7

Synthesis of Urethane Acrylate

To a 100-mL round-bottom flask, 4.00 g of hexamethylene diisocyanate, 5.69 g of 2-hydroxyethyl acrylate, and 10.0 g of ethyl acetate serving as a solvent were charged, and 0.30 g of the solid acid catalyst (AA-3) of Catalyst Preparation Example 3 was added thereto as a catalyst.

A reaction was conducted at a reaction temperature of 80° C. under stirring. After four hours from the start of the reaction, a small amount of the reaction mixture was sampled, and the NCO content (%) thereof was measured. The NCO conversion rate determined on the basis of the measurement result was 98%. The reaction mixture was filtered through a 0.2-μm membrane filter to remove the catalyst. Thus, an ethyl acetate solution of a target urethane acrylate was obtained. The residual ratio of the catalyst in the ethyl acetate solution was below the detection limit (5 ppm).

Example 8

Synthesis Example of Urethane Acrylate

To a 100-mL round-bottom flask, 4.00 g of hexamethylene diisocyanate, 6.38 g of 2-hydroxypropyl acrylate, and 10.0 g of ethyl acetate serving as a solvent were charged, and 0.30 g of the solid acid catalyst (AA-1) of Catalyst Preparation Example 1 was added thereto as a catalyst.

A reaction was conducted at a reaction temperature of 80° C. under stirring. After two hours from the start of the reaction, a small amount of the reaction mixture was sampled, and the NCO content (%) thereof was measured. The NCO conversion rate determined on the basis of the measurement result was 98%. The reaction mixture was filtered through a 0.2-μm membrane filter to remove the catalyst. Thus, an ethyl acetate solution of a target urethane acrylate was obtained. The residual ratio of the catalyst in the ethyl acetate solution was below the detection limit (5 ppm).

Example 9

Synthesis of Urethane Acrylate

To a 100-mL round-bottom flask, 4.00 g of hexamethylene diisocyanate, 6.38 g of 2-hydroxypropyl acrylate, and 10.0 g of ethyl acetate serving as a solvent were charged, and 0.30 g of the solid acid catalyst (AA-3) of Catalyst Preparation Example 3 was added thereto as a catalyst.

A reaction was conducted at a reaction temperature of 80° C. under stirring. After 12 hours from the start of the reaction, a small amount of the reaction mixture was sampled, and the NCO content (%) thereof was measured. The NCO conversion rate determined on the basis of the measurement result was 92%. The reaction mixture was filtered through a 0.2-μm membrane filter to remove the catalyst. Thus, an ethyl acetate solution of a target urethane acrylate was obtained. The residual ratio of the catalyst in the ethyl acetate solution was below the detection limit (5 ppm).

Example 10

Synthesis of Urethane Acrylate

To a 100-mL round-bottom flask, 4.00 g of hexamethylene diisocyanate, 5.69 g of 2-hydroxyethyl acrylate, and 10.0 g of ethyl acetate serving as a solvent were charged, and 0.30 g of phosphoric acid radical/zirconia prepared by a well-known conventional method was added thereto as a catalyst. A reaction was conducted at a reaction temperature of 60° C. under stirring. After five hours from the start of the reaction, a small amount of the reaction mixture was sampled, and the NCO content (%) thereof was measured. The NCO conversion rate determined on the basis of the measurement result was 60%. The reaction mixture was filtered through a 0.2-μm membrane filter to remove the catalyst. Thus, an ethyl acetate solution of a target urethane acrylate was obtained. The residual ratio of the catalyst in the ethyl acetate solution was below the detection limit (5 ppm).

Comparative Example 1

To a 100-mL round-bottom flask, 4.00 g of hexamethylene diisocyanate, 5.69 g of 2-hydroxyethyl acrylate, and 10.0 g of ethyl acetate serving as a solvent were charged, and 0.002 g of dibutyltin dilaurate was added thereto as a catalyst.

A reaction was conducted at a reaction temperature of 60° C. under stirring. After five hours from the start of the reaction, a small amount of the reaction mixture was sampled, and the NCO content (%) thereof was measured. The NCO conversion rate determined on the basis of the measurement result was 99%, thus achieving a conversion rate equivalent to that of Example 1. However, it was difficult to isolate the catalyst.

Comparative Example 2

To a 100-mL round-bottom flask, 4.00 g of hexamethylene diisocyanate, 5.69 g of 2-hydroxyethyl acrylate, and 10.0 g of ethyl acetate serving as a solvent were charged.

A reaction was conducted at a reaction temperature of 60° C. under stirring. After five hours from the start of the reaction, a small amount of the reaction mixture was sampled, and the NCO content (%) thereof was measured. The NCO conversion rate determined on the basis of the measurement result was 14%. That is, it is found that when the reaction is performed without using a catalyst in order to prevent the influence of a residual metal, the reaction hardly occurs.

Comparative Example 3

To a 100-mL round-bottom flask, 4.00 g of hexamethylene diisocyanate, 5.69 g of 2-hydroxyethyl acrylate, and 10.0 g of ethyl acetate serving as a solvent were charged, and 0.002 g of dibutyltin dilaurate was added thereto as a catalyst.

A reaction was conducted at a reaction temperature of 60° C. under stirring. After two hours from the start of the reaction, a small amount of the reaction mixture was sampled, and the NCO content (%) thereof was measured. The NCO conversion rate determined on the basis of the measurement result was 100%, thus achieving a conversion rate equivalent to that of Example 2. However, it was difficult to isolate the catalyst.

Comparative Example 4

To a 100-mL round-bottom flask, 4.00 g of hexamethylene diisocyanate, 5.69 g of 2-hydroxyethyl acrylate, and 10.0 g of ethyl acetate serving as a solvent were charged.

A reaction was conducted at a reaction temperature of 60° C. under stirring. After two hours from the start of the reaction, a small amount of the reaction mixture was sampled, and the NCO content (%) thereof was measured. The NCO conversion rate determined on the basis of the measurement result was 21%. That is, it is found that when the reaction is performed without using a catalyst in order to prevent the influence of a residual metal, the reaction hardly occurs.

Comparative Example 5

To a 100-mL round-bottom flask, 10.00 g of hexamethylene diisocyanate and 14.22 g of 2-hydroxyethyl acrylate were charged, and 0.006 g of dibutyltin dilaurate was added thereto as a catalyst.

A reaction was conducted at a reaction temperature of 60° C. under stirring. After one hour from the start of the reaction, a small amount of the reaction mixture was sampled, and the NCO content (%) thereof was measured. The NCO conversion rate determined on the basis of the measurement result was 100%, thus achieving a conversion rate equivalent to that of Example 3. However, it was difficult to isolate the catalyst.

Comparative Example 6

To a 100-mL round-bottom flask, 10.00 g of hexamethylene diisocyanate and 14.22 g of 2-hydroxyethyl acrylate were charged.

A reaction was conducted at a reaction temperature of 60° C. under stirring. After one hour from the start of the reaction, a small amount of the reaction mixture was sampled, and the NCO content (%) thereof was measured. The NCO conversion rate determined on the basis of the measurement result was 21%. That is, it is found that when the reaction is performed without using a catalyst in order to prevent the influence of a residual metal, the reaction hardly occurs.

Comparative Example 7

First, 300.0 g of polypropylene glycol having a hydroxyl value of 56.0 (molecular weight: 2,000) was charged in a 500-mL beaker and the temperature thereof was controlled to 80° C., and 38.0 g of diphenylmethane diisocyanate, the temperature of which was controlled to 60° C., was added. Stirring was conducted while the state in which the temperature was controlled to 80° C. was maintained, and a thickening behavior with the progress of the reaction was traced. The time required for the resin viscosity to reach 20 Pa·s was very slow; 100 minutes.

Comparative Example 8

To a 100-mL round-bottom flask, 4.00 g of hexamethylene diisocyanate, 6.38 g of 2-hydroxypropyl acrylate, and 10.0 g of ethyl acetate serving as a solvent were charged. A reaction was conducted at a reaction temperature of 80° C. under stirring. After 12 hours from the start of the reaction, a small amount of the reaction mixture was sampled, and the NCO content (%) thereof was measured. The NCO conversion rate determined on the basis of the measurement result was 0%. That is, it is found that when the reaction is performed without using a catalyst in order to prevent the influence of a residual metal, the reaction does not occur.

INDUSTRIAL APPLICABILITY

The urethane-forming reaction catalyst, the urethane material, and the method for producing a urethane material of the present invention can be used for the production of various urethane compounds.

BRIEF DESCRIPTION OF DRAWING

FIG. 1 includes ammonia TPD spectra of solid acid catalysts A and B measured by a temperature-programmed desorption apparatus TPD-AT-1.

REFERENCE NUMERALS

A: solid acid catalyst AA-1
B: solid acid catalyst AA-2

The invention claimed is:

1. A method for producing a urethane material comprising allowing a hydroxyl group-containing compound to react with an isocyanate compound in the presence of a urethane-forming reaction catalyst comprising (A) a composite metal oxide in which a metal oxide (A-2) or a non-metal compound (A-3) is carried on the surface of a metal oxide carrier (A-1), wherein the composite metal oxide (A) has a Hammett acidity function ($H_0$) in the range of −3 to −9; the metal oxide (A-2) is any one of a molybdenum oxide, a tungsten oxide, and a tantalum oxide, or any combination thereof; and the non-metal compound (A-3) is a sulfuric acid radical-containing compound or a phosphoric acid radical-containing compound.

2. The method for producing a urethane material according to claim 1, wherein the hydroxyl group-containing compound is a polyol and the isocyanate compound is a compound having two or more isocyanate groups.

3. The method for producing a urethane material according to claim 1,
wherein the hydroxyl group-containing compound is a polyol and the isocyanate compound is a compound having one isocyanate group and a radical polymerizable group, or
the hydroxyl group-containing compound is a compound having one hydroxyl group and a radical polymerizable group and the isocyanate compound is a compound having two or more isocyanate groups.

4. A method for producing a urethane material comprising the steps of:
1) allowing a polyol to react with a polyvalent carboxylic acid to produce a polyester polyol; and
2) conducting a urethane-forming reaction between the polyester polyol and the isocyanate,
wherein a urethane-forming reaction catalyst is a composite metal oxide (AA) in which a metal oxide (A-2) is carried on a surface of a metal oxide carrier (A-1), wherein zirconia is used as the metal oxide carrier (A-1) and a molybdenum oxide is used as the metal oxide (A-2); the composite metal oxide (AA) has a Hammett acidity function ($H_0$) in the range of −3 to −9; and the steps are sequentially conducted in the presence of the composite metal oxide (AA).

5. The method for producing a urethane material according to claim 1, wherein the metal oxide carrier (A-I) is any one of zirconia, silica, alumina, and titania, or any combination thereof.

6. The method for producing a urethane material according to claim 5, wherein the hydroxyl group-containing compound is a polyol and the isocyanate compound is a compound having two or more isocyanate groups.

7. The method for producing a urethane material according to claim 5,
wherein the hydroxyl group-containing compound is a polyol and the isocyanate compound is a compound having one isocyanate group and a radical polymerizable group, or the hydroxyl group-containing compound is a compound having one hydroxyl group and a radical polymerizable group and the isocyanate compound is a compound having two or more isocyanate groups.

* * * * *